(12) United States Patent
Culver

(10) Patent No.: US 12,324,424 B2
(45) Date of Patent: Jun. 10, 2025

(54) FISHING LURE

(71) Applicant: Logan Culver, Port Crane, NY (US)

(72) Inventor: Logan Culver, Port Crane, NY (US)

(*) Notice: Subject to any disclaimer, the term of this patent is extended or adjusted under 35 U.S.C. 154(b) by 33 days.

(21) Appl. No.: 18/473,214

(22) Filed: Sep. 23, 2023

(65) Prior Publication Data

US 2025/0098653 A1    Mar. 27, 2025

(51) Int. Cl.
*A01K 85/00*    (2006.01)

(52) U.S. Cl.
CPC ............ *A01K 85/00* (2013.01); *A01K 85/005* (2013.01)

(58) Field of Classification Search
CPC .............................. A01K 85/00; A01K 85/005
See application file for complete search history.

(56) References Cited

U.S. PATENT DOCUMENTS

| | | | | |
|---|---|---|---|---|
| 2,764,838 A * | 10/1956 | Singer | A01K 93/00 | 43/44.91 |
| 3,589,053 A * | 6/1971 | Fynbo | A01K 93/00 | 43/44.92 |
| 3,949,513 A * | 4/1976 | Dmytriw | A01K 93/00 | 43/44.93 |
| 4,472,903 A * | 9/1984 | Hutson | A01K 95/00 | 43/44.93 |
| 4,616,441 A * | 10/1986 | Dmytriw | A01K 93/00 | 43/44.91 |
| 4,691,468 A * | 9/1987 | Fernbach | A01K 95/02 | 43/44.9 |
| 4,893,433 A * | 1/1990 | Scheffler | A01K 93/00 | 43/44.9 |
| 6,125,574 A * | 10/2000 | Ganaja | A01K 91/03 | 24/136 L |
| 8,656,634 B2 * | 2/2014 | Farley | A01K 95/00 | 43/44.92 |
| 8,950,107 B1 * | 2/2015 | Rosenbloom | A01K 95/02 | 43/44.87 |
| 9,301,514 B2 * | 4/2016 | Pearcy | A01K 91/03 | |
| 9,867,365 B1 * | 1/2018 | Rosenbloom | A01K 95/02 | |
| 10,264,775 B2 * | 4/2019 | Brown, Sr. | A01K 95/02 | |
| 12,137,678 B2 * | 11/2024 | Douglas | A01K 93/00 | |
| 2008/0295386 A1 * | 12/2008 | Hudson | A01K 95/02 | 43/44.91 |
| 2009/0188151 A1 * | 7/2009 | Bartholomew | A01K 95/005 | 43/44.87 |
| 2012/0060404 A1 * | 3/2012 | Baron | A01K 93/02 | 43/44.87 |
| 2016/0302401 A1 * | 10/2016 | Grundy | A01K 95/02 | |

* cited by examiner

*Primary Examiner* — Richard G Davis (74) *Attorney, Agent, or Firm* — Hinman, Howard & Kattell, LLP; Lawrence Rosenthal (57) ABSTRACT

A bead-shaped fishing lure is provided that can easily be secured to a fishing line while a hook is attached to the line. The lure includes a body and cap, where the cap includes a protrusion and the body has a corresponding hole, where the cap and body can be affixed to one another by inserting the protrusion into the hole to yield a spherical or spheroidal shape. A channel along the length of either the body or the protrusion receives the fishing line such that the lure is affixed to the fishing line by friction to inhibit motion of the lure along the fishing line when the cap and body are secured together. The cap can be affixed to the body using screw threads, friction, or pegs on the protrusion that rotate into recesses at the bottom of the hole. The fishing lure can be made from plastic, metal, rubber, polymer, and the like.

15 Claims, 7 Drawing Sheets

FISHING LURE

FIELD OF THE DISCLOSURE

The present disclosure relates generally to fishing lures, and specifically to bead lures that resemble fish eggs and can be affixed to and removed from any location on a fishing line while a fishing hook and/or other tackle is affixed to the end of the line.

BACKGROUND INFORMATION

One type of common fishing lures is provided in the form of small beads that resemble fish eggs and are used to attract fish and optionally to add weight to a rig. When choosing fishing lure beads, it is important to consider the type of fish one is targeting, the water conditions, and the type of rig being used. For example, if one is fishing for trout in a clear stream, small, clear beads might be used. If one is fishing for bass in a muddy lake, larger, brighter beads might be used.

The spherical or spheroidal/ovoidal appearance of a fishing bead is designed to imitate a single fish egg floating down the river, which makes for an attractive bait. Generally, a fishing bead is attached to the fishing line and then secured to the line or trapped between two other objects, such as weights, so it does not move along the fishing line.

A common design for a fishing bead is a small bead that has a hole bored through it, where the fishing line is threaded through the hole. In such a design, the fishing line needs a free end to thread through the hole in the bead. Therefore, the bead generally needs to be inserted onto the line prior to the fishhook being attached to the line. These beads are typically affixed to the line using a silicon or plastic peg that is inserted into one end of the hole in the bead, providing friction between the bead and the line.

Some fishing beads may be provided with a slit in the side that the fishing line is placed into, so that they can be more easily attached and removed from the line. These beads also need a silicon or plastic peg to be affixed to the line. Such pegs, however, need to be replaced for each new bead, which can be costly, and they can be harmful to the environment. In addition, the pegs are small and difficult to manipulate and can be easily lost. More importantly, these pegs can detract from the round egglike appearance of the bead and therefore result in a less effective lure.

Fishermen will want to replace the beads after the beads wear out or to use one with a different color or size depending on conditions. This may happen several times throughout the day. Many fishing lure beads are attached to a rig in such a way, as described above, that the hook needs to be cut off the line in order to change the bead. This is time consuming and wasteful.

Accordingly, there is a need for an improved fishing bead that is easier and more convenient to affix to—and remove from—a fishing line, maintains a uniform spherical or spheroidal/ovoidal appearance when affixed to the line, and does not have extraneous and disposable pieces that are expensive, easily lost, and harmful to the environment.

SUMMARY OF EXEMPLARY EMBODIMENTS OF THE DISCLOSURE

Embodiments of the disclosure provide a bead fishing lure that can have the appearance of a fish egg or the like, which is easily attachable to and removable from a fishing line, and is reusable. The bead lure includes a body and cap that, when fitted together, has a shape that is generally spherical, spheroidal, or ovoidal. The body and cap each have a flat surface that can be aligned to produce the overall shape. The body can be about the same size as the cap in some embodiments. In further embodiments, the body can be larger than the cap, and in still further embodiments the cap can be larger than the body. In some embodiments, the body is provided with a narrow lengthwise channel that runs along the full length of the flat surface to a depth that can correspond approximately to the centerline of the lure, where the channel is configured to receive a portion of a fishing line therein. The width of this channel is at least as wide as the diameter of the fishing line to which the lure will be attached.

The central portion of the flat surface of the lure body has a hole therein that is wider than the channel and runs substantially perpendicular to the flat surface to approximately the same depth as the channel. The flat surface of the smaller cap has a central protrusion that has about the same shape as the hole in the body, with the length of the protrusion being about equal to the depth of the hole.

The fishing lure can be affixed to a fishing line by first laying a portion of the fishing line into the body channel, and then inserting the protrusion of the cap into the body hole to affix the cap to the body, thereby forming an overall spherical, spheroidal, or ovoidal shape of the affixed lure. When the lure is assembled on the fishing line, the end of the cap protrusion presses the fishing line against the bottom of the narrow channel, thereby preventing the lure from moving along the fishing line.

In some embodiments, the cap protrusion and body hole may each be provided with matching threads, such that the cap can be screwed tightly onto the body to secure the lure to the line. In further embodiments, the protrusion and hole may be provided without threads, and the cap and body can be pressed together and secured to each other by frictional forces between the protrusion and hole, trapping the fishing line at the bottom of the body channel. In these embodiments, the protrusion and hole can have a constant cross-section size (e.g., a cylindrical shape). Alternatively, the cap protrusion and body hole may each be tapered in a conforming way (e.g., the cross-sectional area changes along the length of each). In additional embodiments, the protrusion and hole may have the same non-circular cross-section shape, such that the protrusion again fits closely into the hole and the cap and body are held together by friction.

In another embodiment, the end of the cap protrusion may be provided with a pair of small pegs protruding from the end thereof, where the width of the pegs is not wider than the width of the narrow body channel. The bottom of the body hole can have two recesses formed around a portion of the hole perimeter, where the recesses extend from opposite lower side walls of the narrow channel. The height of each recess above the bottom of the hole and channel is at least as large as the height of each peg at the end of the protrusion. In some embodiments, the recesses can be formed with a constant height above the bottom of the hole. In other embodiments the height of each recess may be tapered, having a larger height where the recess meets the side wall of the channel, and this height becoming shorter as the perimeter of the hole bottom is traversed. The lure can be affixed to a fishing line by first laying the fishing line into the narrow channel of the body. The protrusion of the cap can then be inserted into the body hole, with the small pegs being aligned with the channel such that the cap and body can be fully pushed together. In this position, the pegs are aligned with the recesses at the bottom of the hole, and the cap and body can be locked together by rotating the cap with respect to the body such that the pegs slide along a circular path into the opposing recesses and are trapped there by the upper surface of the recesses. If the recesses have a tapered height, the protrusion will press more tightly against the fishing line in the channel as the cap is turned further.

In further embodiments, there is no channel provided in the body, and the protrusion of the cap is provided with such a channel configured to receive a length of fishing line therein. The bead can be secured to the line via frictional forces between the body, cap, and fishing line located within the protrusion channel when the body and cap are secured together using any of the securement arrangements described herein.

In any of these embodiments, particularly those in which the cap and body are affixed together by spiral threads, the rounded surface of the cap and/or body can be provided with a slot therein that is configured to accept a screwdriver blade (flat or Philips head), a coin, a knife edge, or the like, which can facilitate rotation of the cap relative to the lure body.

The bead lure can be easily removed from the fishing line by separating the cap from the body and removing the line from the body channel. This separation can be achieved by unscrewing the cap from the body (for threaded protrusions/holes), by prying the cap and body apart (for friction securement), or by rotating the cap relative to the body until the pegs line up with the body channel and then lifting the cap away from the body (for peg/recess securement).

The bead lure can also be moved easily to a different location on the line by merely loosening the connection between the cap and body, sliding the lure along the line to a desired location, and then re-affixing the cap to the body tightly. In all of the disclosed embodiments, the disclosed fishing lure can be attached to, removed from, or moved along the fishing line while a hook and/or other hardware is secured to the end of the line. Removal of a hook and threading the end of the fishing line through a hole in the lure is not required for the various disclosed embodiments of the fishing lure.

Fishing bead lures according to the present disclosure can be made from one or more of a variety of materials including, e.g., plastic, metal, glass, rubber, polymer, or the like, and can be formed using materials of any desired color(s).

BRIEF DESCRIPTION OF THE DRAWINGS

Further objects, features and advantages of the present disclosure will become apparent from the following detailed description taken in conjunction with the accompanying figures showing illustrative embodiments and features of the disclosed fishing bead lure, in which.

While the present disclosure will now be described in detail with reference to the figures, it is done so in connection with the illustrative embodiments and is not limited by the particular embodiments illustrated in the figures. It is intended that changes and modifications can be made to the described embodiments without departing from the true scope and spirit of the present disclosure as defined by the appended claims.

DETAILED DESCRIPTION OF EXEMPLARY EMBODIMENTS

Embodiments of the disclosure provide a removable and reusable fishing bead lure that eliminates the need for a silicone peg and the need to remove a fishhook in order to remove or replace the bead. The design of the novel bead lure can save a fisherman valuable time by allowing the lure to be attached to a line and removed easily, without disturbing the hook. The disclosed lure can also be loosened slightly to allow simple relocation of the lure at a different point on the fishing line. In addition, the bead is securely fastened to the fishing line, whereas when small pegs are used to secure lures to the line, as in the prior art, these pegs could easily slip out from the bead, allowing undesirable motion of the bead lure along the fishing line.

Figure 1A:
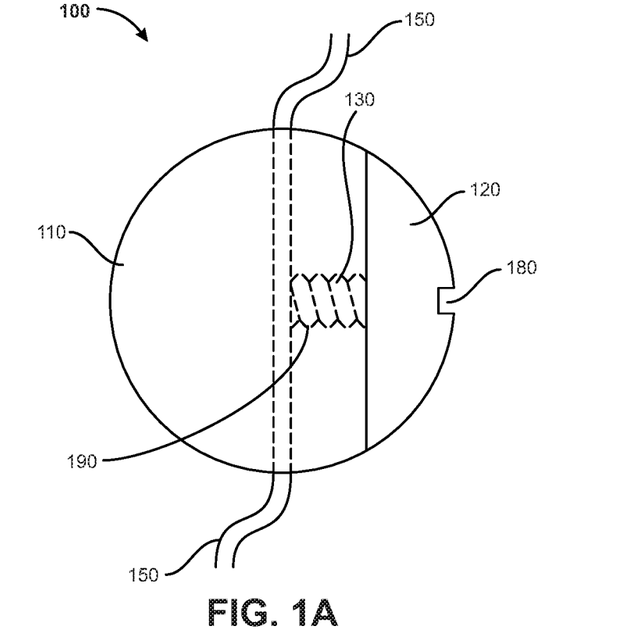
FIG. 1A is a side view of a fishing lure affixed to a fishing line in accordance with certain embodiments of the disclosure.

FIG. 1A illustrates a side view of a bead lure 100 in accordance with certain embodiments of the disclosure. The bead lure 100 includes a substantially round or spherical lure that is made up of a main body 110 and a cap 120 that together form the lure. Each of the body 110 and the cap 120 has a flat surface, such that when these two components are connected together, the flat surfaces meet to produce an overall round body. The flat surfaces of the body 110 and cap 120 preferably meet between the midpoint of the overall lure 100 and the rounded surface of the cap 120, as shown in FIG. 1A. For example, the distance between the centerline of the lure 100 (marked by the location of the fishing line 150 in FIG. 1A) and the plane where the body 100 and cap 120 meet can be between about ⅓ to about ⅔ of the distance between this centerline and the furthest point on the outer rounded surface of the cap 120. Slightly thicker or thinner caps 120 may be used in some embodiments. Fishing line 150 passes through the center of the lure 100, and is secured to the lure 100 as described herein such that the lure 100 does not move relative to the fishing line 150.

Figure 1B:
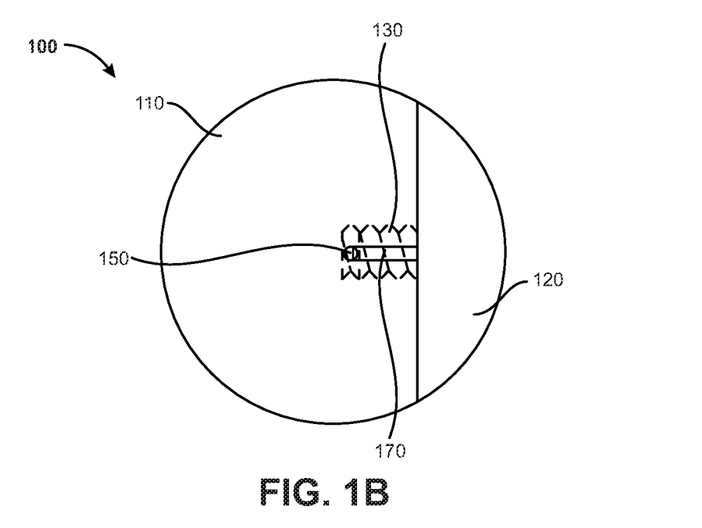
FIG. 1B is an end view of the fishing lure of FIG. 1A.
Figure 2A:
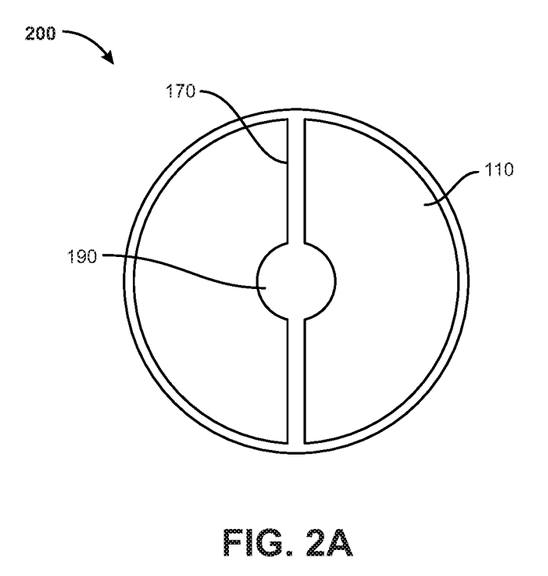
FIG. 2A shows a top view of the body of the fishing lure of FIG. 1A.

FIG. 1B shows an end view of the fishing lure 100 of FIG. 1A. A narrow channel 170 is provided that extends in depth from the flat surface of the body 110 to about the centerline of the lure 100 shown in FIG. 1A, and the channel 170 runs along the entire length of the lure body 110. The lure body 110 is provided with a hole 190 at the center of the flat surface that extends in depth from the flat surface to the bottom of the channel 170 and is substantially perpendicular to the flat surface of the body 110, as shown in the side view of the body 110 in FIG. 1A. The top view of the body in FIG. 2A illustrates the channel 170 that runs through the entire length of the lure body 110 and through the center of the hole 190. The width of the channel 170 can be about the same width as, or slightly larger than, the width of the fishing line 150 that the lure 100 will be used with, such that the fishing line 150 can be placed within the channel 170 and extend from both ends of the lure 100.

Figure 2B:
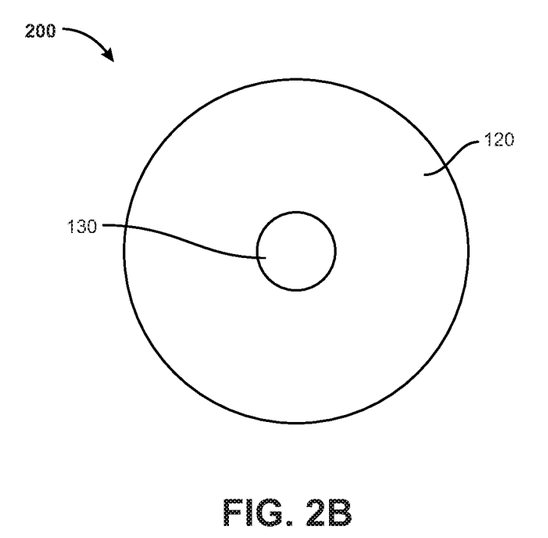
FIG. 2B shows a top view of the cap of the fishing lure of FIG. 1A.

The cap 120 is provided with a round protrusion 130 at the center of its flat surface, which extends in a perpendicular direction from that flat surface, as shown in FIG. 1A. The placement of this protrusion 130 at the center of the cap's flat surface is shown in the top view of the flat surface of the cap 120 in FIG. 2B. In one embodiment, both the hole 190 and the protrusion 130 can be provided with matching threads, such that the cap 120 can be screwed onto the lure body 110 to secure it thereto and result in a lure 100 that has a substantially uniform rounded shape. The length of protrusion 130 can be about the same or slightly smaller than the depth of the hole 190 from the flat surface of the cap 110, such that the flat surfaces of the body 110 and cap 120 touch or have a very thin gap between them when the cap 120 is fully screwed onto the body 110.

Figure 1C:
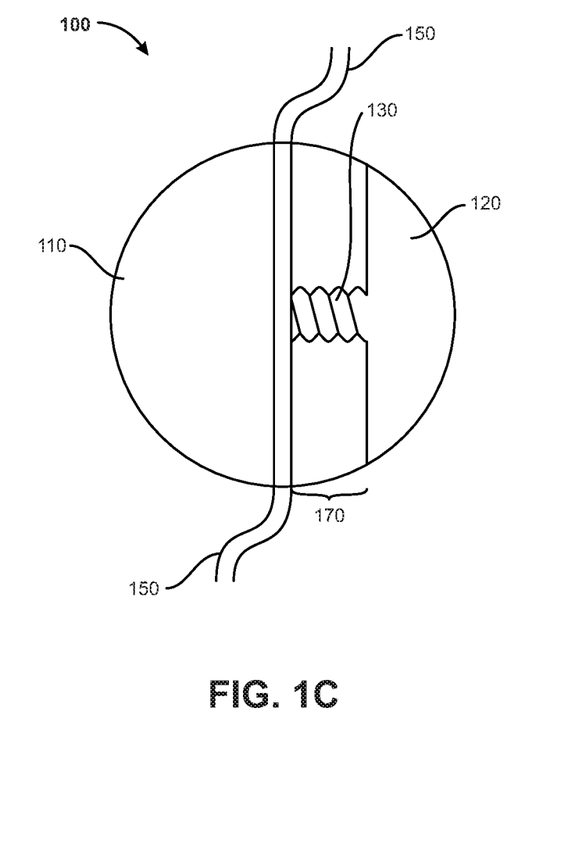
FIG. 1C is a cross-sectional side view of the fishing lure of FIG. 1A.

FIG. 1C is a cross-sectional side view of the lure 100 that passes through the length of the channel 170. In this view, it can be seen clearly that the end of the protrusion 130 presses the central portion of the fishing line 150 against the bottom of the channel 170 when the cap 120 is securely screwed into the body 110. In this manner, the protrusion 130 secures the fishing line 150 against the bottom of the channel 170 to prevent the lure 100 from sliding up or down the fishing line 150 and maintain it in a desired location on the line 150.

Accordingly, the lure 100 can be securely affixed to a fishing line 150 by first placing a portion of the fishing line 150 into the channel 170 of the body 110, then screwing the cap 120 securely into the hole 190. The lure 100 can also be removed easily from the line 150 by merely unscrewing the cap 120 fully and lifting the line 150 out of the channel 170 in the lure body 110. This attachment and removal procedure does not require removal of a hook or any other components (e.g. a snap swivel) from the end of the line, whereas this would be necessary to slide the end of a fishing line through a hole in a conventional solid bead lure to attach it.

In some embodiments, the center of the rounded surface of the cap 120 may be provided with a shallow slot 180 cut into it, as shown in FIG. 1A. This slot 180 can facilitate screwing of the threaded protrusion 130 of the cap 120 into the threaded hole 190 of the body 110. The width of slot 180 can be selected to match the thickness of any standard screwdriver blade or of a common coin, such as a penny or a dime. In further embodiments, the slot 180 can be configured as a recessed cross shape that is configured to receive a Phillips-type screwdriver head. When the threaded protrusion 130 is fully screwed into the threaded hole 190, the overall shape of the bead lure 100 is a substantially uniform sphere.

The shape of the lure 100 can be spherical such that the flat surfaces of the cap 120 and body 110 are circular. This guarantees that the edges of the cap 120 and body 110 will line up when these two components are screwed together, resulting in a uniform spherical shape of the lure 100. In some embodiments, the overall shape of the lure 100 can be ovoidal or spheroidal, as long as the flat surfaces of the cap 120 and body 110 are circular, to ensure that the overall shape of the lure 100 is uniform when assembled. Circular flat surfaces for these components can be achieved by locating these flat surfaces in a plane that is perpendicular to a symmetry axis of the overall ovoidal or spheroidal shape of the lure 100.

Figure 3:
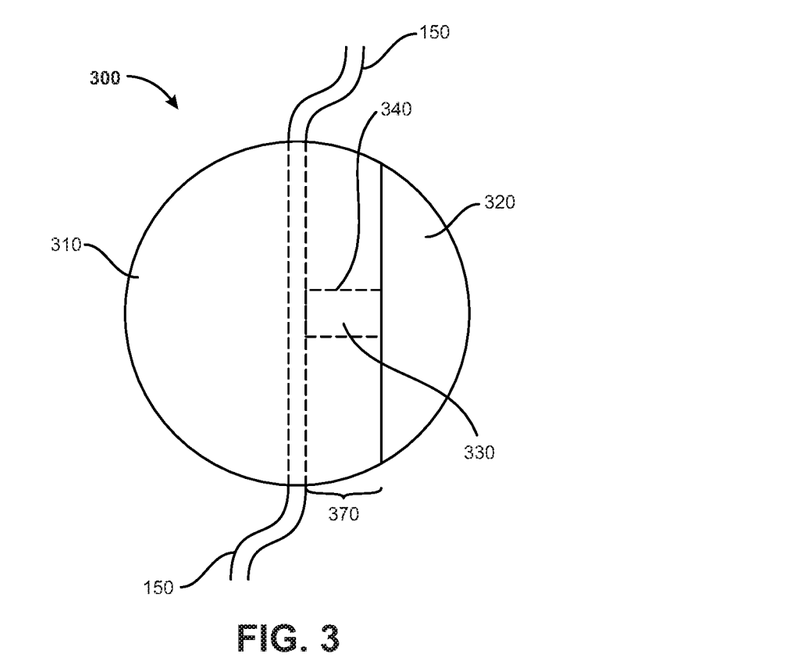
FIG. 3 is a side view of a fishing lure affixed to a fishing line in accordance with further embodiments of the disclosure.

In another embodiment, illustrated in a side view in FIG. 3, a bead lure 300 can be provided that has an overall similar configuration to that of the bead lure 100 shown in FIGS. 1A-C and 2A-B. The cross section in FIG. 3 is along the channel 370 in the body 310, similar to the view shown in FIG. 1C for the bead lure 100. However, in this embodiment, the hole 340 in body 310 and the protrusion 330 of cap 320 are substantially cylindrical in shape with matching diameters and are not threaded. The cap 320 can be secured onto the body 310 by merely pressing them together, and they are held together by a frictional fit between the protrusion 330 and hole 340. The end of the protrusion 330 will press the fishing line 150 against the bottom of the channel 370 in the lure body 310, thereby securing the lure 300 to a particular location on the fishing line 150. The lure can be removed easily by prying apart the cap 320 and body 310 and lifting the fishing line 150 out from the channel of the body 310.

The flat surfaces of the body 310 and cap 320 need not be circular but may have matching oval shapes if the lure 300 is spheroidal or ovoidal in shape. The cap 320 can be freely rotated relative to the body 320 when these two pieces are pressed together to ensure that the oval flat surfaces line up, resulting in an overall uniform ovoidal or spheroidal shape of the lure 300.

Figure 4:
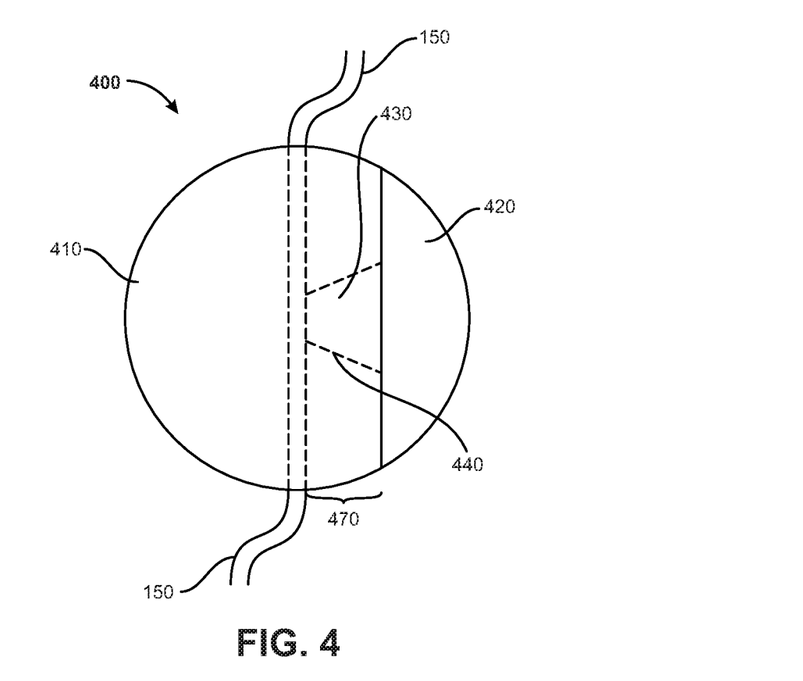
FIG. 4 is a side view of a fishing lure affixed to a fishing line in accordance with still further embodiment of the disclosure.

In still another embodiment, illustrated in side view in FIG. 4, a bead lure 400 can be provided that is similar to that of the bead lure 300 shown in FIG. 3B. The plane of the drawing page in FIG. 4 is parallel to the channel 470 in the body 410, similar to the view shown in FIG. 3 for the bead lure 300. However, in this embodiment, the round hole 440 in body 410 may be tapered such that the end of the hole 440 at the flat surface has a larger diameter than at the end of the hole 440 that is at the bottom of the channel 470. This results in a hole having the shape of a frustum. The protrusion 430 of cap 420 can be provided with a taper that matches that of the hole 440, e.g., in the shape of a frustum, such that the cap 420 and body 410 of lure 400 fit together securely when pressed together, also securing the fishing line 450 to the bottom of the channel 470. As with the lure 300, the flat surfaces of the body 410 and cap 420 need not be circular but may have matching oval shapes if the lure 400 is spheroidal or ovoidal in shape. The cap 420 can be freely rotated relative to the body 420 when these two pieces are pressed together, to result in an overall uniform ovoidal or spheroidal shape of the lure 400.

In further embodiments, a lure can be provided that is similar to the lures 300, 400 illustrated in FIGS. 3 and 4, respectively. However, the lure, which can use friction between a protrusion and corresponding hole to secure the cap to the body, can include non-flat surfaces on the cap and body that align when the cap is affixed to the body. Any desired contour of these surfaces may be used, such that the non-flat cap surface from which the protrusion extends has a contour that matches the corresponding non-flat surface of the body into which the channel and hole are formed. When the cap and body are pressed together to secure the fishing line within the channel, these non-flat surfaces align to yield a uniform outer shape of the lure that can be spherical, ovoidal, or spheroidal.

In other embodiments, a bead fishing lure can be provided that is generally similar to the lures 300, 400, where the cross-sectional shape of the protrusion of the cap can be noncircular. For example, the protrusion may have a shape that is square, triangular, hexagonal, oval, or the like in cross section. The hole in the body of the lure can have the same shape as that of the corresponding protrusion, such that the protrusion fits securely into the hole when the cap and body are pressed together. The lateral profile of the protrusion and corresponding hole may be uniform in size, similar to those in the lure 300 illustrated in FIG. 3. In other embodiments, these protrusions and holes may be tapered, having a cross-sectional size that varies with depth, similar to the bead lure 400 shown in FIG. 4. In these embodiments, the cap and body of the lure can be pressed together to secure a fishing line 150 within a channel in the body of the lure, and the cap and body are held together by a frictional fit between the protrusion and the hole.

Figure 5A:
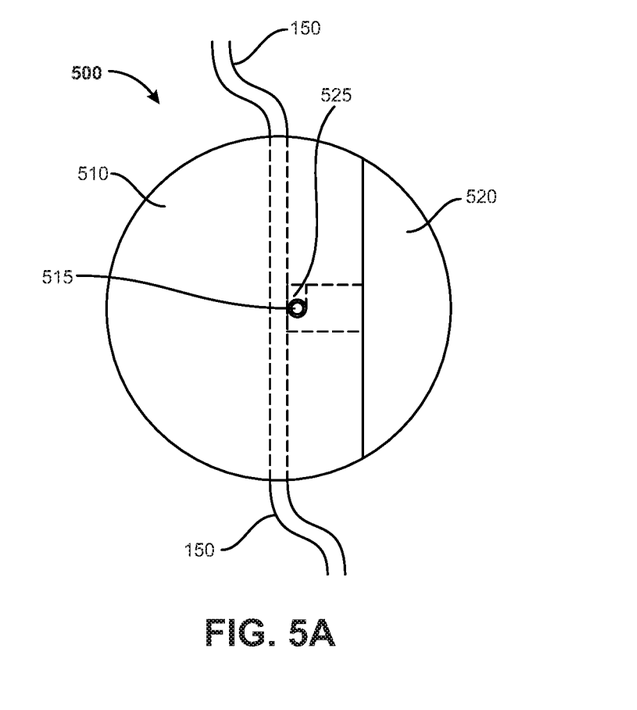
FIG. 5A a side view of a fishing lure affixed to a fishing line in accordance with another embodiment of the disclosure.
Figure 5B:
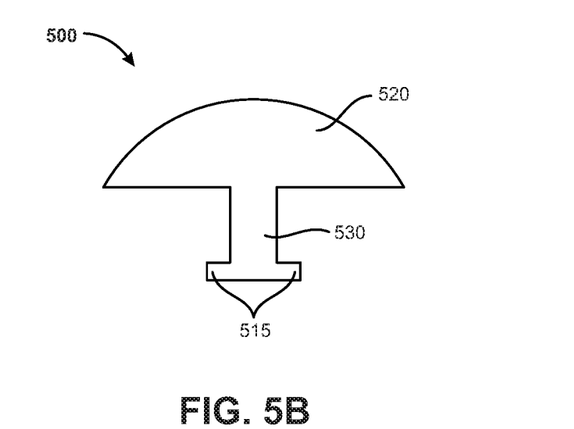
FIG. 5B is a side view of the cap of the fishing lure of FIG. 5A.

In a still further embodiment, a fishing lure 500 can be provided that includes a different arrangement for securing the cap 520 to the body 510 of the lure 500, thereby affixing the lure 500 to a fishing line 150. In this embodiment, shown in FIGS. 5A-5D, interlocking pegs are used to secure the cap 520 to the body 510. As shown in FIG. 5B, the cap 520 has a cylindrical protrusion 530, similar to the protrusion 330 shown in FIG. 3. However, the protrusion 530 includes two small pegs 515 protruding from opposite sides at the end of protrusion 530 as illustrated in FIG. 5B. The width of these pegs 515 when viewed from the end of the protrusion 530 is preferably about the same as the width of the channel 570 in the body 510, or they may be slightly narrower than the channel 570.

Figure 5C:
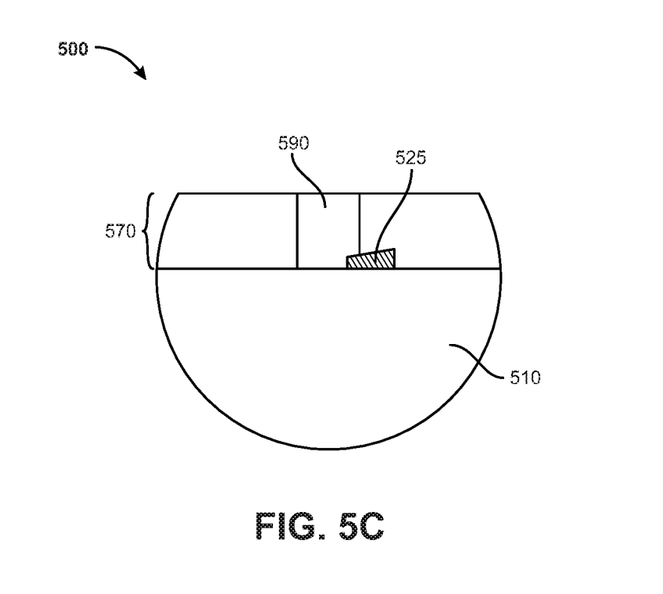
FIG. 5C is a cross-sectional side view of the body of the fishing lure of FIG. 5A.

FIG. 5C shows a cross section of the body 510 of the bead lure 500, where the cross section is taken through the channel 570. At the bottom of the hole 590 that extends to the bottom of the channel 570, a recess 525 is provided in the perimeter of the hole 590 that extends from the wall of the channel 570 to some angular extent around the hole 590. In the top view of FIG. 5D, this angular extent is about 90 degrees, although it may be larger or smaller in some embodiments, e.g., between about 45 degrees and 135 degrees. The depth of this recess 525 into the side of the hole 590 is at least equal to the distance that the pegs 515 protrude outward from the protrusion 530 in FIG. 5B, and it may be slightly deeper.

Figure 5D:
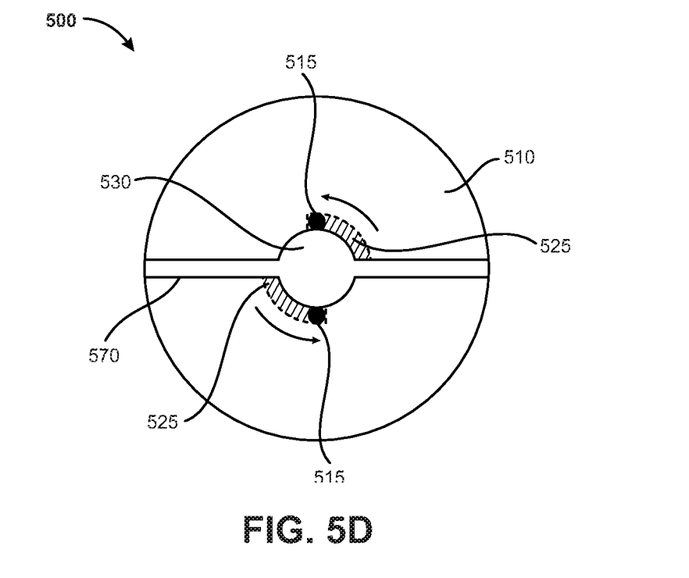
FIG. 5D is a top view of the body of the fishing lure of FIG. 5A.

As shown in FIG. 5D, the lower wall of the hole 590 is provided with two such recesses 525 that can have the shape of an arc following the contour of the hole wall. The two recesses 525 extend from opposite side walls of the channel 570 around a portion of the lower perimeter of the hole 590, such that they are substantially symmetrical across the center of the hole as shown in FIG. 5D.

A side view of a recess 525 is illustrated in the cross-sectional view of the lure body 510 in FIG. 5C. As can be seen in this figure, the recess 525 extends into the body 510 of the lure 500 at the lower end of the hole 590. The height of the recess 525 above the bottom of the hole 590 and channel 570 tapers slightly from a maximum height at the channel wall (towards the right of FIG. 5C) to a lower height away from the channel wall (towards the center in FIG. 5C). In other embodiments, the height of the recess 525 can be uniform.

To secure the lure 500 to a fishing line 150, the fishing line 150 is first placed inside the length of the channel 570 of the lure body 510. The protrusion 530 of the cap 520 is then placed into the hole 590, such that the pegs 515 align with and are lowered into the channel 570 adjacent to the hole 590. When the cap 520 is fully pressed down into the hole 590, the cap 520 is then twisted relative to the body 510 such that the pegs 515 slide through the recesses 525 and are held in place by the upper surface of the recesses 525. The top view in FIG. 5D shows the pegs 515 locked in the recesses 525 after the cap 520 has been twisted counterclockwise, in the direction of the curved arrows.

The tapered height of the recesses 525 shown in FIG. 5C can tighten the end of the protrusion 530 against the fishing line 150 in the channel 570 as the cap 520 is rotated into place. If the recess 525 has a uniform height, this height may be selected such that the end of the protrusion 530 will provide appropriate pressure against the fishing line 150 in the channel 570 to prevent the lure 500 from moving relative to the fishing line 150 when the cap 520 is secured against the body 510.

To remove the lure 500 from the fishing line 500, the cap 520 can be rotated (e.g., clockwise in FIG. 5D) until the pegs 515 align with the channel 570. The cap 520 can then be lifted out of the hole 590 and the line 150 lifted out of the channel 570 to separate the lure 500 from the fishing line 150. As with the lure 100 illustrated in FIGS. 1A-1C, the center of the rounded surface of the cap 520 may be provided with a shallow slot or groove(s) configured to receive a flat or Phillips-type screwdriver head, a coin or the like, to facilitate rotation of the cap 520 relative to the body 510 for easier attachment or removal of the lure 500 to/from the fishing line 150.

Figure 6A:
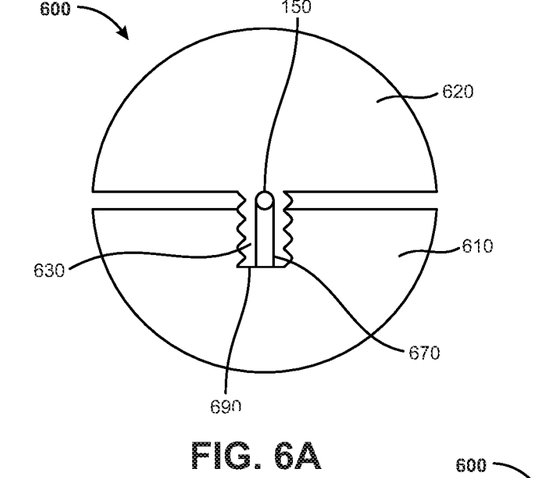
FIG. 6A is a cross-sectional end view of a fishing lure attached to a fishing line in accordance with yet another embodiment of the disclosure.
Figure 6B:
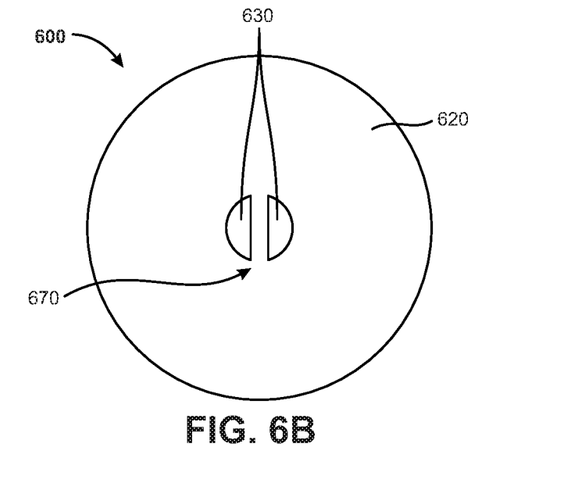
FIG. 6B is a top view of the cap portion of the lure shown in FIG. 6A.
Figure 6C:
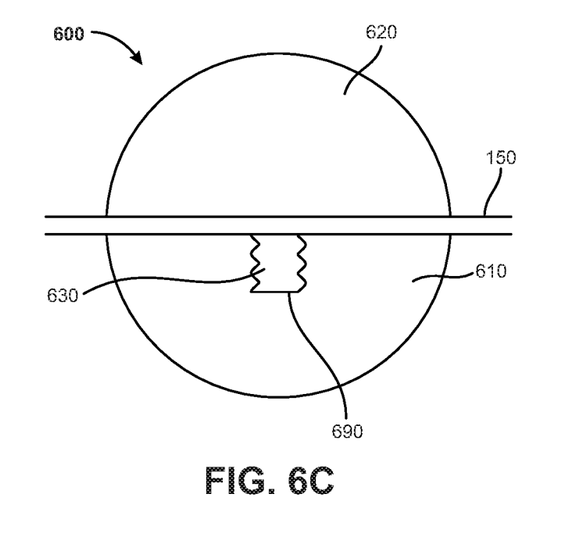
FIG. 6C is a cross-sectional side view of the fishing lure of FIG. 6A.

In a further embodiment, shown in FIGS. 6A-6C, a fishing lure 600 includes a cap 620 that is provided with a protrusion 630 that includes a narrow channel 670 therein configured to receive a length of fishing line 150. A cross-sectional end view of the lure 600 is provided in FIG. 6A. In this figure, the channel 670 can be seen to extend through the entire height of the protrusion 630, to a depth that approximately corresponds to the lower flat surface of the cap 620. The fishing line 150 is located within this channel 670, and the cap 620 is secured to the body 610 by threaded engagement of the protrusion 630 with the corresponding hole 690 in the body 610. The fishing line 150 is thus coupled to the lure 600 by frictional forces between the fishing line 150 and the flat (or contoured) internal surfaces of the body 610 and cap 620 of the assembled lure 600.

A top view of the cap 620 is shown in FIG. 6B, illustrating the protrusion 630 that is "split" by the channel 670 that receives a portion of the fishing line 150. When the cap 620 is secured to the body 610, the fishing line 150 will be squeezed between them in the areas just outside of the protrusion 630 shown in FIG. 6B, thereby inhibiting movement of the lure 600 along the length of the fishing line 150.

FIG. 6C shows a cross-sectional side view of the lure 600. In this figure, the fishing line 150 is shown to be trapped between the body 610 and cap 620 in the regions to the left and right of the protrusion 630. Channel 670 lies in the plane of this figure, such that only the rear half of protrusion 630 is seen.

In still further embodiments, the cap 620 and body 610 can be secured to one another using any of the other securement arrangements described herein. For example, the protrusion 630 and corresponding hole 690 can be configured such that the cap 620 and body 610 are affixed to one another by frictional forces, as illustrated in FIGS. 3 and 4, or alternatively by a locking arrangement such as that illustrated in FIGS. 5A-5D.

The fishing bead lure according to any of the embodiments described herein can be formed from any of a variety of materials. Such materials include plastics, resins, rubbers, metals, polymers, and the like. In some embodiments, the cap and body of the lure can be formed from different materials. The color or colors of the outer surface of the lure can be selected to provide an appealing appearance to certain fish, to increase the effectiveness of the lure.

The foregoing merely illustrates the principles of the present disclosure. Various modifications and alterations to the described embodiments will be apparent to those skilled in the art in view of the teachings herein. It will thus be appreciated that those skilled in the art will be able to devise numerous techniques which, although not explicitly described herein, embody the principles of the present disclosure and are thus within the spirit and scope of the present disclosure.

What is claimed is:

1. A fishing lure, comprising:
   a body and a cap;
   wherein the cap comprises a protrusion and the body comprises a corresponding hole, such that the cap can be affixed to the body by inserting the protrusion into the hole to yield a shape of the lure that is at least one of spherical, spheroidal, or ovoidal,
   wherein the body comprises a channel configured to receive a length of a fishing line,
   wherein the channel extends across a full length of the body,
   wherein the hole and the channel have the same depth,
   wherein the hole is wider than the channel, and
   wherein, when the cap is affixed to the body, the lure is secured to at least a portion of the length of the fishing line within the channel by frictional forces to inhibit motion of the lure along the fishing line.

2. The lure of claim 1, wherein the protrusion and the hole are each provided with corresponding screw threads configured to affix the cap to the body.

3. The lure of claim 1, wherein the cap is secured to the body by friction between the protrusion and the hole.

4. The lure of claim 1, wherein the cap is configured to be affixed to the body using pegs provided at the end of the protrusion, and the pegs are configured to rotate into recesses provided along a bottom perimeter of the hole.

5. The lure of claim 1, wherein the shape of the lure is spherical.

6. The lure of claim 1, wherein the shape of the lure is at least one of spheroidal or ovoidal.

7. The lure of claim 1, wherein a rounded surface of at least one of the cap or the body is provided with a slot configured to facilitate rotation of the cap relative to the body.

8. The lure of claim 1, wherein each of the cap and the body are formed from at least one of a plastic, a metal, a glass, a rubber, a resin, or a polymer.

9. A fishing lure, comprising:
   a body and a cap;
   wherein the body comprises a channel extending across a full length of a first surface thereof that is configured to receive a length of fishing line, and further comprises a hole in a center of the first surface that is wider than a width of the channel;
   wherein the hole and the channel have the same depth;
   wherein the cap comprises a second surface and a protrusion extending from a center of the second surface that has a size and shape that are the same size and shape as the hole;
   wherein the cap is configured to be affixed to the body by inserting the protrusion into the hole;
   wherein the first surface and the second surface align when the cap is affixed to the body to yield a shape of the lure that is at least one of spherical, spheroidal, or ovoidal; and
   wherein, when the length of fishing line is provided within the channel, an end of the protrusion presses the length of fishing line against a bottom of the channel to secure the lure to the length of fishing line and inhibit motion of the lure along the length of fishing line.

10. The lure of claim 9, wherein:
    the protrusion and the hole are each provided with corresponding screw threads configured to secure the cap to the body; and
    wherein each of the first surface and the second surface is flat.

11. The lure of claim 10, wherein the cap is provided with a slot configured to facilitate rotation of the cap relative to the body.

12. The lure of claim 9, wherein the cap is secured to the body by friction between the protrusion and the hole.

13. The lure of claim 9, wherein the cap is configured to be affixed to the body using pegs provided at an end of the protrusion, and the pegs are configured to rotate into recesses provided along a bottom perimeter of the hole.

14. The lure of claim 9, wherein the shape of the lure is spherical.

15. The lure of claim 9, wherein the shape of the lure is at least one of spheroidal or ovoidal.

* * * * *